Oct. 13, 1970 T. J. HARRIS 3,534,359
OPTICAL POINTER FOR DISPLAY SYSTEM
Filed Jan. 12, 1968
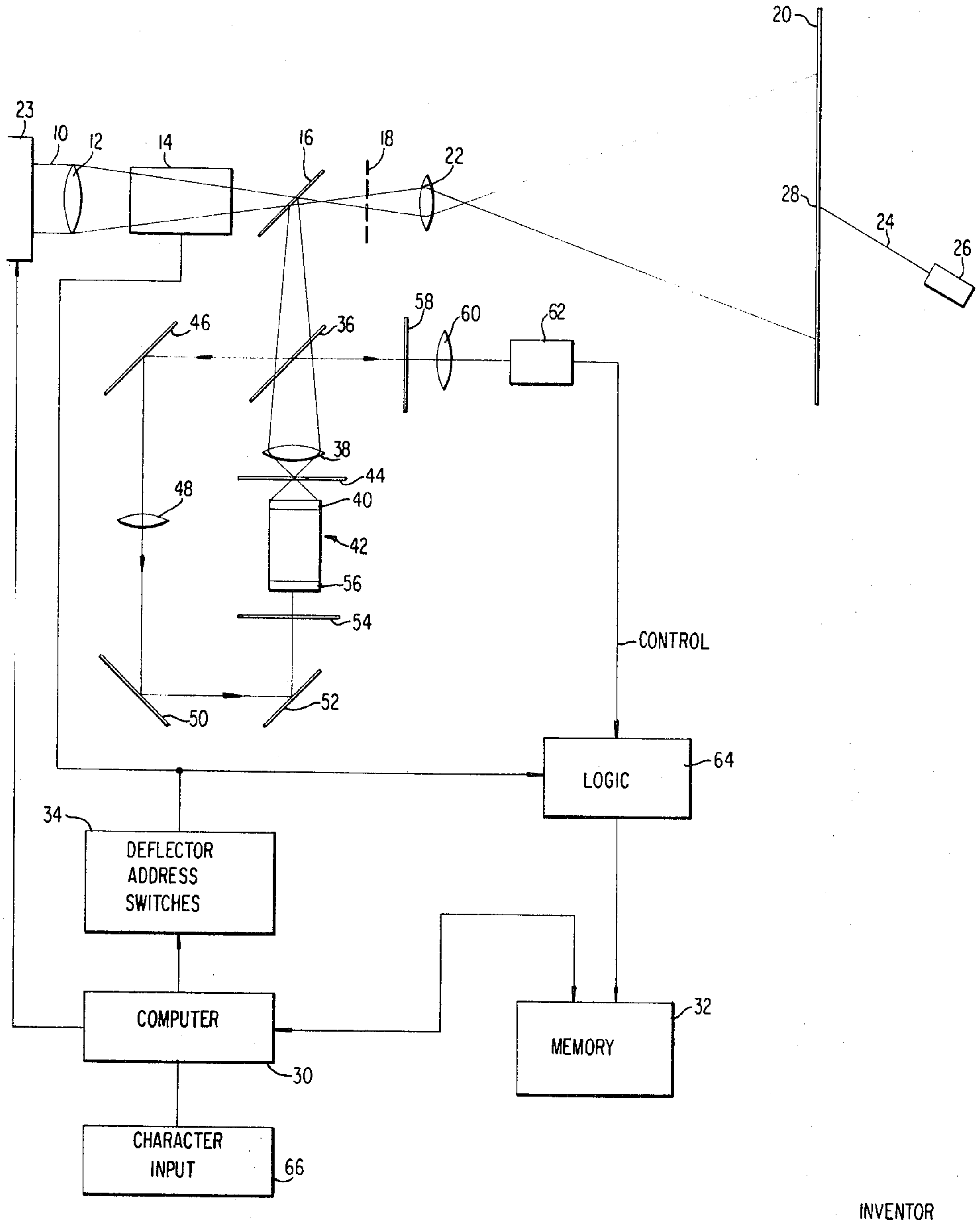
INVENTOR
THOMAS J. HARRIS
BY Sughrue, Rothwell, Mion, Zinn & Macpeak
ATTORNEYS

United States Patent Office 3,534,359 Patented Oct. 13, 1970

3,534,359

OPTICAL POINTER FOR DISPLAY SYSTEM

Thomas J. Harris, Poughkeepsie, N.Y., assignor to International Business Machines Corporation, Armonk, N.Y., a corporation of New York Filed Jan. 12, 1968, Ser. No. 697,459
Int. Cl. G06k *15/18*
U.S. Cl. 340—324 8 Claims

ABSTRACT OF THE DISCLOSURE

An alpha-numeric character from an address in a computer memory is displayed as an image at a corresponding address or position on a display screen. The image is formed by a linearly polarized character-shaped light beam and is positioned on the screen by means of a digital light deflector controlled by the computer. A light gun is used as an optical pointer. The light gun emits a beam of light which is linearly polarized orthogonally to the polarization of the character image. If it is desired to erase a character from a particular position on the screen, the light beam from the light gun is directed onto the character image which is to be erased. The light from this position contributed by both the character image and the light gun is applied to different inputs of a two input polarization-sensitive optical AND gate. If there is a coincidence of light at both inputs, the optical AND gate provides an optical output signal which is converted to an electrical control signal which in turn controls memory logic circuits to erase from the memory the data stored at the memory address corresponding to the selected position on the screen. If it is desired to write a new character onto a selected position of the screen, the new character is fed into the computer by a typewriter or keypunch, the light gun is pointed at the screen position on which the new character is to be displayed, and the computer causes the deflector to scan the screen. When coincidence of the light from the deflector and light gun occurs, the optical AND gate again produces a control signal which is applied to the memory logic circuit to transfer from the computer to the memory the address of the deflector beam at coincidence together with the new character to be stored in the memory at that address and to be displayed at the corresponding position on the screen.

CROSS-REFERENCE TO RELATED APPLICATION

A patent application entitled, "Optical AND Gate," Ser. No. 697,407, filed Jan. 12, 1968, now Pat. No. 3,448,282, by Thomas J. Harris and Harold Fleisher and assigned to the assignee of this application discloses the details of the optical AND gate used in the invention covered by this application.

BACKGROUND OF THE INVENTION

Field of the invention

The invention relates to the field of computer-controlled optical display systems.

Description of the prior art

Real-time displays, especially military command control displays, perform under the control of, or connection with, a digital computer. These systems require the projection of a map upon a large screen and selected display of alpha-numeric characters and symbols on certain points of the projected map. The position and nature of these characters and symbols are defined by the computer.

In many of these systems, it is necessary to have the facility to designate a particular point on the map to the computer by pointing to the position of that point on the screen. Cathode ray tube display systems of the prior art use a pen-like device containing a photocell. The light pen is placed in contact with the CRT display screen over the particular point, and, as the point is generated on the CRT screen, the photocell generates a signal which is transmitted back to the computer. In another prior art system, an optical system using light deflectors and laser beams also requires the light pen to be placed in contact with the display screen.

SUMMARY OF THE INVENTION

The object of this invention is to provide a display system with greater flexibility which permits data in the form of characters and symbols to be erased from, and written into, the memory of a computer which controls the display.

In the present invention, this object is obtained by providing an improved display system including a light pen or optical pointer which does not contact the display screen. A linearly polarized shaped light beam is used to display on a screen an image of the data. A light gun which emits a light beam linearly polarized orthogonally to the image is pointed at the displayed data. A polarization-sensitive optical AND gate is responsive to the coincidence at the same position on the screen of light linearly polarized in both directions to produce an optical control signal. The control signal may then be used to control computer logic circuits to erase from the computer memory the data stored in the corresponding position of the memory. If it is desired to display a new character on a particular position of the screen, the light gun is pointed at that position, and the display beam scans the screen. When coincidence of the display beam and light gun occurs, the optical AND gate generates a control signal which causes the new character to be written in the memory address corresponding to the screen position of the light gun beam.

BRIEF DESCRIPTION OF THE DRAWING

The drawing illustrates a schematic diagram of a preferred embodiment of the invention.

DESCRIPTION OF A PREFERRED EMBODIMENT

An alpha-numeric character to be displayed is contained in a linearly polarized light beam 10 which is shaped in the form of the character and focused by a lens 12 through a digital light deflector 14 and a beam splitter 16 onto an image plane 18, and then is projected onto a display screen 20 by a lens 22. Block 23 is a means for selecting a desired character to form a character-shaped beam. The matrix and selecting means are described in more detail in U.S. Pat. No. Re. 26,170. Deflector 14 corresponds to the third deflector in the patent. A separate projection means (not shown) displays a map, for example, on the screen.

Erasing a displayed character from the screen is accomplished by directing a linearly polarized light beam 24 from light gun 26 onto a point 28 at which the character to be erased is displayed. Light beam 24 is linearly polarized orthogonally to the linear polarization of the light beam 10 which is imaged on the screen 20. Lens 22 images all the light scattered from point 28, i.e., both the back scattered character image light and the light of beam 24, onto the image plane 18. This composite light image is then partially reflected by beam splitter 16 onto the transparent photoemissive surface 40 of an optical AND gate 42 through an analyzer 44. Analyzer 44 is oriented to pass the linearly polarized light from light gun 26 while blocking the orthogonally polarized light from the displayed character. Light reflected by beam splitter 36 and a mirror 46 is also imaged by a lens 48 via mirrors 50 and 52 and through an analyzer 54 on the electro-optic crystal 56, such as KDP, of the optical AND gate 42. Analyzer 54 is oriented to pass the polarized light of the displayed character while blocking the orthogonally polarized light from the light gun 26.

There are, therefore, two independent inputs to the optical AND gate 42 when point 28 is illuminated by both the polarized displayed character and the orthogonally polarized light from light gun 26. The details of the optical AND gate are presented in the application cross-referenced above, but, briefly, when light strikes the photoemissive surface 40, the electro-optic crystal is charged by electrons from illuminated portions of the photoemissive surface. The electrons are accelerated toward crystal 56. The resultant charge pattern on the crystal induces birefringence in the crystal in areas where charge is present. Consequently, the state of polarization of the displayed character light applied to the crystal is changed when it passes through the charged region of the crystal. The displayed character light then passes through the transparent photoemissive surface 40 and is reflected by the beam splitter 36 to an analyzer 58 which is oriented to block light polarized in the direction of the polarized displayed character light. Thus, when the beam from the light gun and a displayed character are present at the same point on the screen, some of the character display light will be passed by the analyzer 58 and focused by a lens 60 on a photo-detector 62 which produces an electrical control signal corresponding to the light passed by the analyzer. This CONTROL signal is passed through logic circuits 64 to memory 32 to erase the character from the memory at the address corresponding to the position 28 on screen 20. Therefore, the erased character will no longer be displayed under the control of the computer at the point 28.

If there is no coincidence at a selected point on the screen of a character beam and the light gun beam, then the polarization of the character beam will not be changed in passing through crystal 56. Therefore, analyzer 58 will prevent any light from reaching photodetector 62, and no CONTROL signal is produced.

A new character to be displayed on screen 20 is indicated to the computer by a character input device 66, such as a typewriter or keypunch device. The position on the screen at which the character is to be displayed is indicated by pointing light gun 26 at the desired position. After the character has been selected and the position on the screen located by the light gun, light deflector 14 is controlled by computer 30 to scan a linearly polarized light spot across all the possible display positions on the screen 20. When the light beam from light gun 26 and the scanning spot from deflector 14 coincide at the selected position on the screen, optical AND gate 42 produces a CONTROL signal in the manner just described for an erase operation. Logic circuits 64 then function to transfer the setting or address of the light deflector address switches to the memory along with the character selected by the input device 66. The deflector switches then resume their normal display sequence dictated by the computer, and the character selected by the input device 66 is now stored in the memory at the address corresponding to the point on the screen which was selected by the light gun.

At the other positions on the screen, i.e., the positions not illuminated by light gun 26, no light will be passed by analyzer 44, and crystal 56 will not be charged. Therefore, the light from the scanning spot will not have its polarization changed in passing through the crystal, and no light will be passed by analyzer 58, whereby a CONTROL signal is not produced.

While the invention has been particularly shown and described with reference to a preferred embodiment thereof, it will be understood by those skilled in the art that various changes in form and details may be made therein without departing from the spirit and scope of the invention.

What is claimed is:

1. In a display system including a display screen, the improvement comprising:
(a) means for illuminating the display screen with a light image linearly polarized in a first direction,
(b) means for directing onto an area of said screen a light beam linearly polarized in a second direction, the angle between said first and second directions being different from 0° and 180°, and
(c) polarization-sensitive logic means responsive to the coincidence of both said image and said light beam in said area for producing an optical control signal.

2. The improved display system as defined in claim 1, wherein said polarization-sensitive logic means comprises:
(a) electro-optical AND gate means comprising
(1) means for emitting electrons in response to incident light,
(2) an electro-optic crystal which becomes birefrigent when electrically charged,
(3) a first optical input coupled to said electron emitting means, and
(4) a second optical input coupled to said electro-optic crystal,
(b) means for applying said image and said light beam to different ones of said optical inputs so that, upon coincidence of light at both inputs, said crystal is charged by said electrons, and the polarization direction of the light applied to said second input is changed as it passes through a charged region of said crystal, and
(c) analyzer means for blocking light linearly polarized in the direction of the light applied to said second input, whereby light passing through a charged region of said crystal has its polarization direction changed from the direction which said analyzer means blocks so that said analyzer means passes light to produce said optical control signal.

3. The improved display system as defined in claim 2, wherein:
(a) said first and second directions define an angle of 90°,
(b) said light beam is applied to said first input, and
(c) said image is applied to said second input.

4. The improved display system as defined in claim 1:
(a) wherein said light image forms a character, and
(b) further comprising means responsive to said control signal for erasing said character from said screen.

5. The improved display system as defined in claim 1:
(a) wherein said image is a scanning spot, and
(b) further comprising means responsive to said control signal for displaying a character on said screen in a position at which said spot and said light beam coincide.

6. In a computer-controlled display system including a screen, a computer for determining an image to be displayed on the screen and for selecting an area on the screen in which the image is to be displayed, said computer including a memory storing data corresponding to images to be displayed on the screen, the improvement comprising:
(a) means controlled by said computer for illuminating the display screen with a light image linearly polarized in a first direction,
(b) means for directing onto an area of said screen a light beam linearly polarized in a second direction, the angle between said first and second directions being different from 0° and 180°, and
(c) polarization-sensitive logic means responsive to the coincidence of both said image and said light beam in the same area for producing an optical control signal.

7. The improved display system as defined in claim 6 further comprising means responsive to said control signal for erasing from the comuter memory the data represented by the image displayed on said screen.

8. The improved display system as defined in claim 7:

(a) wherein said image is a spot and said illuminating means is controlled by said computer to scan the spot across all display positions of said screen, (b) means for inputting to the computer data to be displayed on the screen in a selected position to which said light beam is directed, whereby said optical control signal is produced upon coincidence of said spot and said light beam, and (c) means responsive to said control signal for storing said data in the memory at the address corresponding to said selected position.

References Cited

UNITED STATES PATENTS

| | | | |
|---|---|---|---|
| 3,189,889 | 6/1965 | Bridgett | 340—324 |
| 3,256,516 | 6/1966 | Melia et al. | 340—324 X |

ALVIN H. WARING, Primary Examiner

D. L. TRAFTON, Assistant Examiner

U.S. Cl. X.R.

178—7.85